United States Patent
Garcia Aranda

(10) Patent No.: US 10,075,388 B2
(45) Date of Patent: Sep. 11, 2018

(54) QUALITY PARAMETERS NEGOTIATION BY SPECIFIC URI

(75) Inventor: Jose Javier Garcia Aranda, Madrid (ES)

(73) Assignee: Alcatel Lucent, Boulogne Billancourt (FR)

(*) Notice: Subject to any disclaimer, the term of this patent is extended or adjusted under 35 U.S.C. 154(b) by 1101 days.

(21) Appl. No.: 13/576,041

(22) PCT Filed: Dec. 23, 2010

(86) PCT No.: PCT/EP2010/070706
§ 371 (c)(1),
(2), (4) Date: Jul. 30, 2012

(87) PCT Pub. No.: WO2011/091927
PCT Pub. Date: Aug. 4, 2011

(65) Prior Publication Data
US 2012/0311025 A1    Dec. 6, 2012

(30) Foreign Application Priority Data

Feb. 1, 2010    (EP) .................................... 10305102

(51) Int. Cl.
| | |
|---|---|
| G06F 15/16 | (2006.01) |
| H04L 12/913 | (2013.01) |
| H04L 29/06 | (2006.01) |

(52) U.S. Cl.
CPC ............ *H04L 47/724* (2013.01); *H04L 69/24* (2013.01)

(58) Field of Classification Search
CPC ............... H04L 45/302; H04L 41/5003; H04L 43/0876
(Continued)

(56) References Cited

U.S. PATENT DOCUMENTS

| | | | | |
|---|---|---|---|---|
| 6,563,796 B1 * | 5/2003 | Saito | ................... | H04L 12/2602 370/252 |
| 6,711,137 B1 * | 3/2004 | Klassen | ................ | H04L 41/142 370/252 |

(Continued)

FOREIGN PATENT DOCUMENTS

WO    WO 98/58474 A1    12/1998

OTHER PUBLICATIONS

K. Lakshman et al., "Adding Realtime Applets and Quality of Service Support to the World Wide Web," ACM, 2 Penn Plaza, Suite 701, New York, USA, XP040132311, pp. 259-266, Jan. 1, 1996.

(Continued)

*Primary Examiner* — Kevin Bates
*Assistant Examiner* — Emad Siddiqi
(74) *Attorney, Agent, or Firm* — Fay Sharpe LLP

(57) ABSTRACT

Method for an application client (C) and an application server (S) to negotiate quality parameters of a path (P) within a communication network ($N_{AC}$, $N_{MC}$, $N_B$, $N_{MS}$, $N_{AS}$) connecting them. The method comprises the application client (C) sending to the application server (S) a request containing an identifier of a resource and said application server (S) sending at least an answer containing data associated to said resource to the application client (C). This request and this answer are transmitted through the path (P). The method is characterized in that the identifier specifies that the at least one answer should be compliant to a quality-aware protocol and contain quality parameters to be enforced by network nodes along the path (P).

11 Claims, 1 Drawing Sheet

(58) Field of Classification Search
USPC .......................................................... 709/203
See application file for complete search history.

(56) References Cited

U.S. PATENT DOCUMENTS

| | | | |
|---|---|---|---|
| 8,959,239 B2* | 2/2015 | Pettersson ............... | H04L 65/80 709/227 |
| 2002/0069238 A1* | 6/2002 | Eard ....................... | H04L 29/06 709/202 |
| 2004/0139088 A1* | 7/2004 | Mandato ................. | H04L 29/06 |
| 2006/0002377 A1* | 1/2006 | Skog ....................... | H04L 47/10 370/352 |
| 2006/0047779 A1* | 3/2006 | Deshpande ....... | G06F 17/30828 709/218 |
| 2007/0005728 A1 | 1/2007 | Elbury et al. | |
| 2007/0127509 A1* | 6/2007 | Lin ................... | H04L 29/06027 370/401 |
| 2008/0240053 A1* | 10/2008 | Oswal et al. ................. | 370/338 |
| 2010/0262705 A1* | 10/2010 | Li ......................... | H04W 28/00 709/229 |

OTHER PUBLICATIONS

International Search Report for PCT/EP2010/070706 dated May 6, 2011.

* cited by examiner

FIG_1
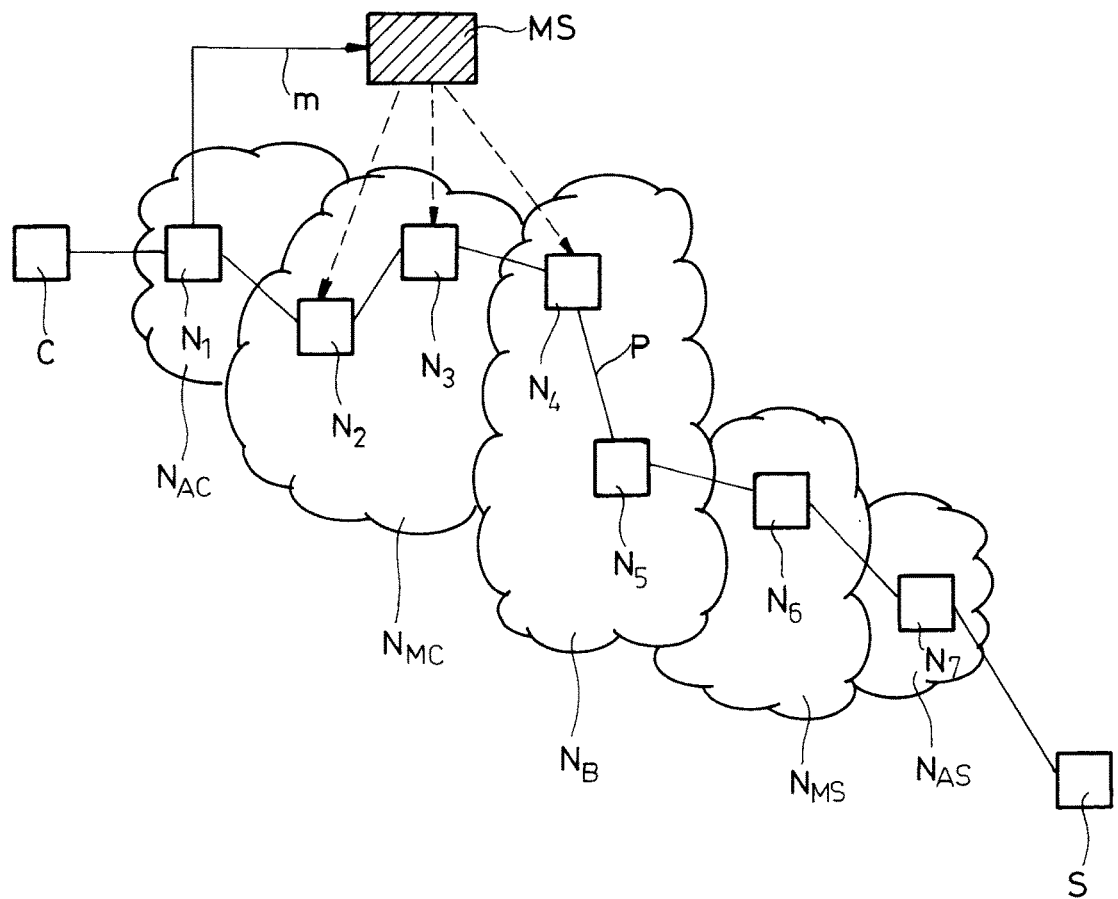
FIG_2
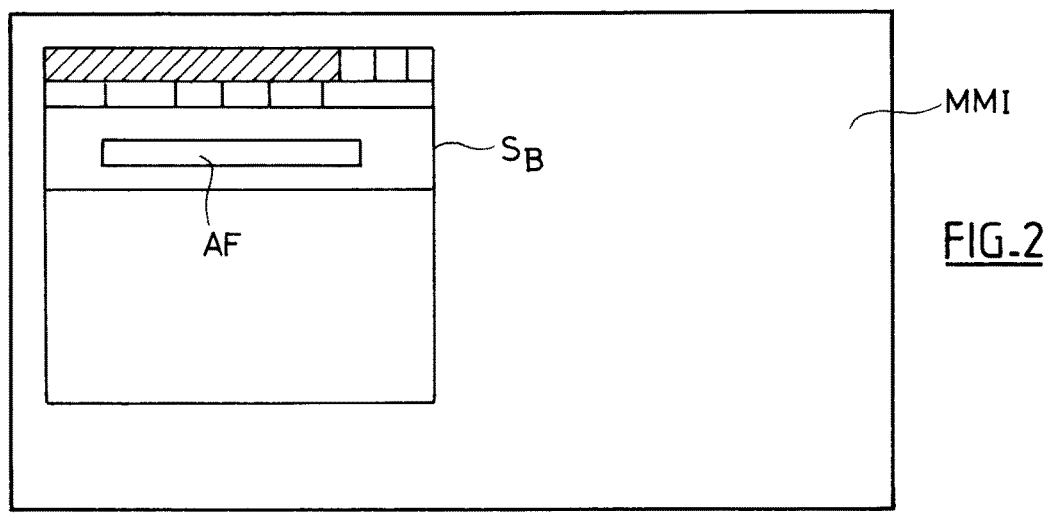

QUALITY PARAMETERS NEGOTIATION BY SPECIFIC URI

The present invention relates to field of transmission of information through communication network between an application server and a application client.

Communication networks enable application clients like browsers to navigate with application servers (or web servers) by specifying an identifier, or URI, of a resource.

These URI (Unified Resource Identifier) comprises URL (Unified Resource Locator) according to the RFC 1738 and define a unique resource inside the Internet. Resources can be considered as the smallest available piece of information. It can be a web page written according to HTML (HyperText Mark-Up Language), a audio or audio-video stream, a multimedia or text file etc.

For some kinds of information, a certain quality of service can be mandatory or at last desirable. For instance, audio or audio-video stream may have to be delivered in real-time to the application client, and with a minimum of latency between packets of the stream to get a smooth rendering to the end user.

The appropriate quality parameters can be negotiated between the application client and the application server, but such a negotiation has little impact on the communication network, whereas the cause of quality degradation is most of the time nodes of the communication network.

It also exists mechanisms to ensure a certain quality of service along a communication path like DiffServ, RSVP . . . but these solutions are available on the lower layers of the protocol stack and not at application level. It is not possible for an end user to request for a quality of service using these protocols.

There is therefore a need for a solution enabling applications to negotiate quality of service parameters in a way compatible with existing standards and practices.

The purpose of the invention is to fulfill this need by proposing a method for an application client and an application server to negotiate quality parameters of a path within a communication network connecting them. The method comprises the application client sending to the application server a request containing an identifier of a resource and said application server sending at least an answer containing data associated to said resource to the application client. This request and this answer are transmitted through the path.

The method is characterized in that the identifier specifies that the at least one answer should be compliant to a quality-aware protocol and contain quality parameters to be enforced by network nodes along the path.

According to an embodiment of the intention, the identifier is a uniform resource identifier (URI) starting with a specific scheme designating this quality-aware protocol.

The network nodes may read the quality parameters and tunes their own parameters to ensure the answers to be transmitted according to these quality parameters.

The quality parameters comprise one or several parameters among a group of latency constraints, jitter constraints, bandwidth constraints.

The application server and the application client may initiate a negotiation phase after the receipt of the answer, this negotiation phase consisting in an iterative sequence of messages enabling quality measurements, and terminating at least when these quality measurements are compliant with the quality parameters.

The invention and its advantages will be described more clearly in the following specification, together with annexed figures.

FIG. 1 illustrates an example of communication network that could connect the application server and the application client and implement the invention.

FIG. 2 shows a typical man-machine interface that could be used at application client-end in the context of the invention.

The method could be considered as having three phases.

The first phase is defined as the handshake phase, in which the application server is contacted by the application client and communicates the quality constraints.

In order to do so, the application client may request the user for the identifier of a resource of the application server. FIG. 2 shows a typical embodiment for this, where a Man-Machine Interface, MMI, displays a window SB associated with a piece of software enabling the user to browser the Internet. With such software, the user can enter in a dedicated field AF the address of this resource.

Such an address is typically an URL ("Uniform Resource Locator") or URI ("Uniform Resource Identifier"). It starts with a scheme designating a protocol to be used. As defined by RFC 1738 of IETF, the scheme may take as values "ftp", "http", "mailto" . . . . According to the invention a new scheme is used to designate a quality-aware protocol. This scheme may for instance be "httpq" to show it is based on the HTTP protocol as defined by RFC2616 and also is quality-aware, as expressed by the "q" letter.

The URL entered by the user may respect the format:
"httpq:" "//" host[":" port] [path["?" query]]

It should also be understood as within the scope of the invention to have the application client determining the resource identifier by other means than prompting the user through a visual MMI. First, of course, the MMI may use other entering means (e.g. vocal commands), but also some application may automatically send httpq requests in a transparent way for the user.

Optionally also, the application client can send the quality headers and the application server can take them into account, when building its answer with the definitive value.

The application server can answer with an HTTP 303 error message which can include some or all of the following QHTTP headers:

Q-Latency-constraint: this header indicates the maximum latency needed for the application.

Q-Jitter-constraint: this header indicates the maximum jitter allowable for the application Q-Bandwidth-constraint: this header indicates the minimum bandwidth needed for the application, measured in bits per second.

Q-PortRange-constraint: this header indicates the UDP or TCP range of ports for the application. Several values, separated by "," can be included in this header with the following syntax:
<protocol> <initial port range> [-<final port range>] [, <protocol><initial port range>[-<final port range>]]

Location: this header indicates the next URL to be used in the negotiation phase, forcing the web browser to send a new Q-HTTP request, towards a new HTTPQ URL.

Q-tries: this header contains the number of tries during negotiation phase and the maximum number of tries. Initially the number of tries is set to 0. If the limit of tries is reached, it is considered that the quality can not be improved anymore. The two values are separated by ",".

Q-Interval: this header indicates the interval time (e.g. in seconds) that the server allows the client to restart the negotiation phase.

Q-Result: this header contains the result of the quality negotiation process. It is initially set to "Ok" or other value with the same meaning.

Q-Upgrade: This header indicates that an upgrade of the network quality is needed. In some sense, it is partially redundant with the type of message (error 303) used in this embodiment, but it can still be useful if the server wants to perform some measurements before asking for an upgrade of the quality of the network. It the value is "No", for instance, then no upgrade is asked to the network and if the value is "Needed" then it indicates that a network upgrade of the quality is required.

Q-Digest: This header contains a hash value generated using the values of all quality headers and a secret server keyword, in order to avoid modification in the headers in the following messages of the negotiation phase.

Q-Autonomous-systems: values separated by ";". Each intermediate autonomous system should fill with its identifier in order to get a complete list of autonomous systems in this header.

After these two messages, the first phase is completed. The path is established and the quality parameters have been sent to the application client. Therefore all intermediate network elements have had the opportunity to read the Q-headers.

FIG. 1 illustrates an example of communication network that could connect the application server and the application client and implement the invention.

In practice, this communication network can be made of several sub-networks. In this example, the application client C is connected to an access network $N_{AC}$ composed of a network element (or node) $N_1$, and the application server S is connected to an access network $N_{AS}$ composed of a network node $N_7$.

Both access networks $N_{AC}$ and $N_{AS}$ are connected to metropolitan-area networks, respectively $N_{MC}$ and $N_{MS}$, which are in turned connected together through a backbone network $N_B$. The metropolitan network $N_{MC}$ is composed of 2 nodes $N_3$ and $N_3$, and the metropolitan network is made of a single node $N_6$. The backbone network comprises two nodes $N_4$ and $N_5$.

Of course many other topologies exist in the art, on which the invention can be deployed easily by the man skilled-in-the-art.

The communication path P linking the application client C with the application server S go through the network elements $N_1$, $N_2$, $N_3$, $N_4$, $N_5$, $N_6$, $N_7$.

As previously said, all these network elements, as sitting in the communication path, have transmitted the two messages exchanged by the application client C and server S and are knowledgeable about the headers transmitted with the server's answer. Knowing these headers and the quality parameters they contain, the network elements can then enforce them.

There may be several ways for the quality parameters to be enforced by the network nodes.

For instance, the access node can trigger a message m sent to a quality management server MS, which is responsible for provisioning the requested quality of service within the network nodes it is in charge of. This trigger could be done at client side (i.e. by node $N_1$) or at server side (i.e. by node $N_7$)

According to another embodiment, part or all the network nodes sitting in the path P can provision on their own the resources needed to ensure the requested quality parameters.

The second phase of the algorithm is the quality negotiation phase. This phase could be regarded as optional, since it adds up quality assurance on what was already reached during handshake phase.

This negotiation phase involves an iterative sequence of messages until the path P is compliant with the minimum quality constraints. This sequence further enables the network to perform some quality measurements.

The application client C sends a Q-HTTP GET message towards the application server S containing all Q-HTTP quality headers. The headers are kept in all messages to provide this information to all the intermediate network elements. It should be noted that this point is different with the regular HTTP protocol according to which the client does not send all headers after receiving a Location header.

According to this embodiment of the invention, the application server S must answer with an HTTP error 303 messages including:
  all quality headers of the received request,
  Q-Timestamp: a new additional header, which has 0 as initial value.
  Q-Result: set to "Ok".
  Location: next "httpq" URL to be redirected to. The general schema is to be used: "httpq" "//" host [":" port] [path["?" query]] with a different query value at each time. The query value can be the value of the Q-Tries header
  The Q-Tries header is updated, adding 1 to its previous value.
  The Q-Digest header is recomputed with the new value of all the other headers.

When the application client C receives this message, it sends again a Q-HTTP GET request. It should not modify any headers, including the Timestamp header built by the server.

Doing so, the application server S is able to measure the elapsed time between the first timestamp and the one inside this newly received message. At this point, there are three possibilities:

1) The maximum number of tries is reached. In this case we can consider that the quality can not be improved anymore. The application server answers with a HTTP 412 message where the Q-Result header's value is "NOK". According to HTTP protocol as defined by the RFC 2616 of IETF, paragraph 10.4.13, the "412" message means that a precondition setting required by the client or the server has not been met.

2) The difference between Timestamp header and current time is small enough to be compliant with the latency constraint. In this case, the application server S answers with an HTTP 200 message, containing the Q-Result header set to "Ok".

3) In the last case, the difference is not small enough, but the number of tries has not reached the maximum value. In this case, an HTTP 303 message is sent back including:
  All quality headers received in the request,
  A new value of Q-Timestamp header,
  The Q-Result header value set to "NOK" (or any other value meaning the result is not ok)
  The Location header set to a new value.

Until one of the terminating conditions is met, the application client will send Q-HTTP requests in order to allow the communication networks $N_{AC}$, $N_{MC}$, $N_B$, $N_{MS}$, $N_{AS}$ to tune themselves, using the HTTP Location header mechanism.

When the 200 Ok message is received, it means that the optimal conditions have been reached and that the client can access the service with enough quality connection or at least the best quality connection provided by the network.

The S server can then start to send messages containing data associated to the resource it requested to said application client. It could for instance be packets containing data of a multimedia resource (e.g. movie and/or audio streaming). The resource can also be the address of another client, with whom the application server can establish the link, and the data would then contain audio and/or video call content.

According to an embodiment of the invention, a third phase could also be deployed while the application is running, in order to check and react when the network conditions change and the overall quality is degraded. The application client can periodically re-execute the negotiation phase, as described above, so that the networks nodes can be re-tuned. The interval according to which such a re-negotiation can be performed is indicated in the Q-Interval header.

To avoid any performance issues due to too many requests from the client, the server can automatically answer with a 200 Ok response, if the Q-Interval requirement is not met.

According to an embodiment of the invention, the provisioning or resources inside the network nodes can be done according to DiffServ mechanism at IP/MPLS level. The Forwarding Class can then be changed to a suitable value for the application purpose during the negotiation phase. Instead of reading actual values contained in the Q-HTTP header, dynamic adaptation can be achieved by moving HTTP traffic to a higher Forwarding Class at each step of the negotiation. As explained previously, the process ends when a configured maximum of iteration is met or when quality parameters are good enough (as seen by the application).

From a network perspective, inactivity timers may also be defined in order to restore QoS profile to its default settings after session is over.

Other network elements can achieve the quality constraints using the Quality headers and it is supposed that each element has tuned itself in terms of bandwidth using the Q-HTTP header Bandwidth constraint and Latency (that normally implies some priority policies).

On the client browser, for providing a default configuration, it would be good that the browser have a configurable set of Quality headers in the browser settings menu, so that these quality headers can easily be present in the first message.

Different business models can be designed on top of this technical invention. For instance, depending on who pays for the quality, the application server can accept the desired application client parameters sent in the first message or force the parameters that the server pays for.

The invention claimed is:

1. A method for an application client (C) and an application server (S) to negotiate quality parameters of a path (P) within a communication network ($N_{AC}$, $N_{MC}$, $N_B$, $N_{MS}$, $N_{AS}$) connecting them, the method comprising:
said application client sending to said application server a request containing an identifier of a resource, and
said application server sending at least an answer containing data associated to said resource to said application client, said request and said at least one answer being transmitted through said path, wherein said identifier specifies that said at least one answer should be compliant to a quality-aware protocol and contain quality parameters to be enforced by network nodes along said path, whereby said network nodes would be able to read said quality parameters and tune their own parameters accordingly, as the quality parameters are being negotiated, to ensure messages of a subsequent communication session are transmitted according to said quality parameters.

2. The method according to claim 1, wherein said identifier is a uniform resource identifier starting with a specific scheme designating said quality-aware protocol.

3. The method according to claim 1, wherein said network nodes read said quality parameters and tune their own parameters to ensure said answers to be transmitted according to said quality parameters.

4. The method according to claim 1, wherein said quality parameters comprise one or several parameters among a group of latency constraints, jitter constraints, bandwidth constraints.

5. The method according to claim 1, wherein said application server and said application client initiate a negotiation phase after the receipt of said answer, said negotiation phase consisting in an iterative sequence of messages enabling quality measurements and terminating at least when said quality measurements are compliant with said quality parameters.

6. A method for an associated application client (C) and an application server (S) to negotiate quality parameters of a path (P) within a communication network (NAC, NMC, NB, NMS, NAS) connecting them, the method comprising:
receiving, from said associated application client, a request containing an identifier of a resource, and
said application server sending at least an answer containing data associated to said resource to said associated application client, said request and said at least one answer being transmitted through said path, wherein said identifier specifies that said at least one answer should be compliant to a quality-aware protocol and contain quality parameters to be enforced by network nodes along said path, whereby said network nodes would be able to read said quality parameters and tune their own parameters according, as the quality parameters are being negotiated, to ensure messages of a subsequent communication session are transmitted according to said quality parameters.

7. The method according to claim 6, wherein said identifier is a uniform resource identifier starting with a specific scheme designating said quality-aware protocol.

8. The method according to claim 6, wherein said quality parameters comprise one or several parameters among a group of latency constraints, jitter constraints, bandwidth constraints.

9. The method according to claim 6, wherein negotiation phase is initiated after the transmission of said answer, said negotiation phase consisting in an iterative sequence of messages enabling quality measurements and terminating at least when said quality measurements are compliant with said quality parameters.

10. A method for an intermediate network node to support communications between an associated application server and an associated application client communicating over a path including the node, the method comprising:
monitoring, by the node, messages exchanged between the associated application server and the associated application client through the node;

reading, by the node, quality parameters values included in the monitored messages as the quality parameters are being negotiated for a subsequent communication session between the associated application server and the associated application client; and tuning, by the node, as the quality parameters are being negotiated, operating parameters of the node to ensure messages of said subsequent communication session between the associated application server and the associated application client are transmitted according to said quality parameters.

11. A client device comprising:

at least one processor; and at least one memory including computer program code;

the at least one memory and the computer program code configured to, with the at least one processor, cause the client device to at least negotiate quality parameters of a path (P) within a communication network ($N_{AC}$, $N_{MC}$, $N_B$, $N_{MS}$, $N_{AS}$) connecting by:

said application client device sending, to an associated application server, a request containing an identifier of a resource, and said application client device receiving from said associated application server, at least an answer containing data associated to said resource, said request and said at least one answer being transmitted through said path, wherein said identifier specifies that said at least one answer should be compliant to a quality-aware protocol and contain quality parameters to be enforced by network nodes along said path, whereby said network nodes would be able to read said quality parameters and tune their own parameters accordingly, as the quality parameters are being negotiated, to ensure messages of a subsequent communication session are transmitted according to said quality parameters.

* * * * *